(12) United States Patent  (10) Patent No.: US 8,531,715 B2
Toda  (45) Date of Patent: *Sep. 10, 2013

(54) METHOD AND SYSTEM FOR FORMING IMAGE, AND EXTERNAL DEVICE

(75) Inventor: Katsuyuki Toda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/297,958

(22) Filed: Nov. 16, 2011

(65) Prior Publication Data

US 2012/0057206 A1  Mar. 8, 2012

Related U.S. Application Data

(63) Continuation of application No. 12/111,437, filed on Apr. 29, 2008, now Pat. No. 8,072,638.

(30) Foreign Application Priority Data

May 28, 2007 (JP) ................................. 2007-140646

(51) Int. Cl.
*G06F 3/12* (2006.01)
*G06K 15/00* (2006.01)

(52) U.S. Cl.
USPC ........................................ 358/1.15; 358/1.16

(58) Field of Classification Search
USPC ............... 358/1.15, 1.18, 1.16, 1.6, 444, 404, 358/448, 1.9, 1.13; 399/364, 365, 366
See application file for complete search history.

(56) References Cited

U.S. PATENT DOCUMENTS

| | | | |
|---|---|---|---|
| 5,956,160 | A | 9/1999 | Watanabe |
| 6,115,137 | A | 9/2000 | Ozawa et al. |
| 6,629,155 | B1 | 9/2003 | Hosoda |
| 8,004,704 | B2 | 8/2011 | Shimoichi |
| 2005/0024498 | A1 | 2/2005 | Iida et al. |
| 2006/0055961 | A1 | 3/2006 | Toda |
| 2006/0146355 | A1 | 7/2006 | Kim |
| 2006/0170715 | A1 | 8/2006 | Toda |
| 2006/0182480 | A1 | 8/2006 | Toda |
| 2006/0192796 | A1 | 8/2006 | Toda |

(Continued)

FOREIGN PATENT DOCUMENTS

| | | |
|---|---|---|
| EP | 0 859 326 A2 | 8/1998 |
| EP | 0 881 817 A2 | 12/1998 |

(Continued)

OTHER PUBLICATIONS

Office Action issued Aug. 14, 2012 in Japanese Patent Application No. 2007-140646.

(Continued)

*Primary Examiner* — Jerome Grant, II
(74) *Attorney, Agent, or Firm* — Oblon, Spivak, McClelland, Maier & Neustadt, L.L.P.

(57) ABSTRACT

An external device is configured to be directly connected to an image forming device. The external device includes an image storage unit configured to store therein image data. The external device further includes a setting unit configured to issue a plurality of output commands of the image data to an image forming device based on a total number of images to be output by the image forming device and a specified mode indicative of a number of images to be output onto one side of a medium. The external device further includes a communication unit configured to transmit the image data based on the plurality of output commands to the image forming device.

18 Claims, 7 Drawing Sheets

(56) References Cited

U.S. PATENT DOCUMENTS

| | | |
|---|---|---|
| 2006/0209316 A1 | 9/2006 | Toda |
| 2007/0216913 A1 | 9/2007 | Toda |
| 2007/0242306 A1 | 10/2007 | Toda |
| 2007/0273898 A1 | 11/2007 | Toda |

FOREIGN PATENT DOCUMENTS

| | | |
|---|---|---|
| EP | 1 659 772 A1 | 5/2006 |
| JP | 09-160430 | 6/1997 |
| JP | 11-024510 | 1/1999 |
| JP | 2001-109324 | 4/2001 |
| JP | 2004-064740 | 2/2004 |
| JP | 2006-023412 | 1/2006 |
| JP | 2006-244130 | 9/2006 |
| JP | 2006-289907 | 10/2006 |
| JP | 2007-88887 | 4/2007 |
| JP | 2007-245518 | 9/2007 |
| WO | WO 97/50243 | 12/1997 |

OTHER PUBLICATIONS

Office Action issued Feb. 21, 2012 in Japan Application No. 2007-140646.

```
<JOBSTART>
<Quality=Normal>
<PaperSize=A4>
<Date=Off>
<Layout=A4/1 × 1>
<Picture=00000001,00000002,00000003>
</JOBSTART>
```

<Capability>
<Quality=Normal,Fine>
<PaperSize=A3,A4>
<Layout=A4/1×1,1×2,1×3,2×2,A3/1×1,1×2,1×3,2×2,4×4>
<Duplex=ON,OFF>
</Capability>

FIG. 9
```
<JOBSTART>
<Quality=Normal>
<PaperSize=A4>
<Layout=A4/1 × 2>
<Duplex=ON>
<Picture=00000001,00000002,00000003>
</JOBSTART>
```
FIG. 10
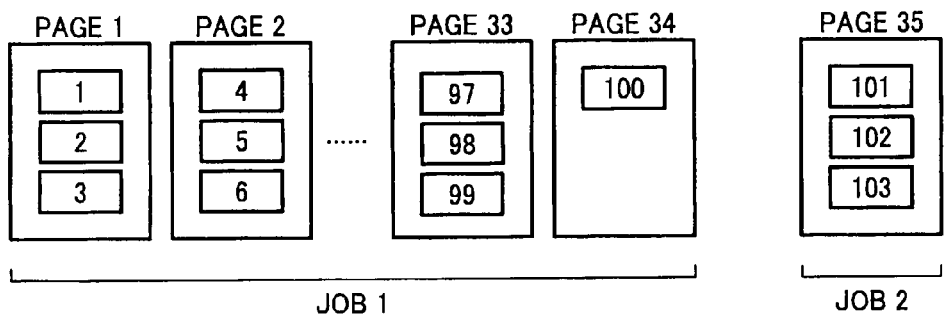
FIG. 11
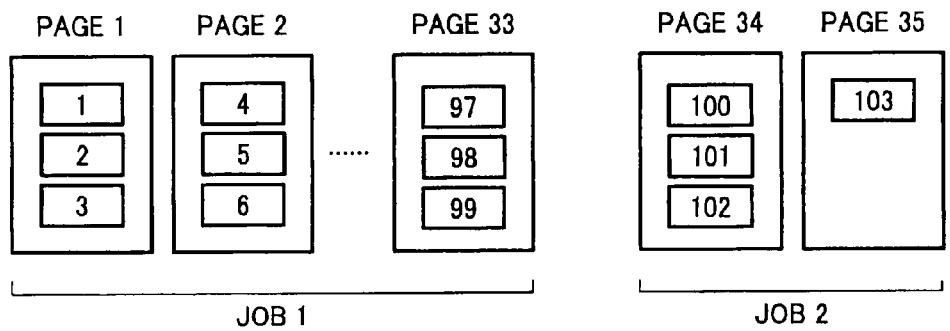

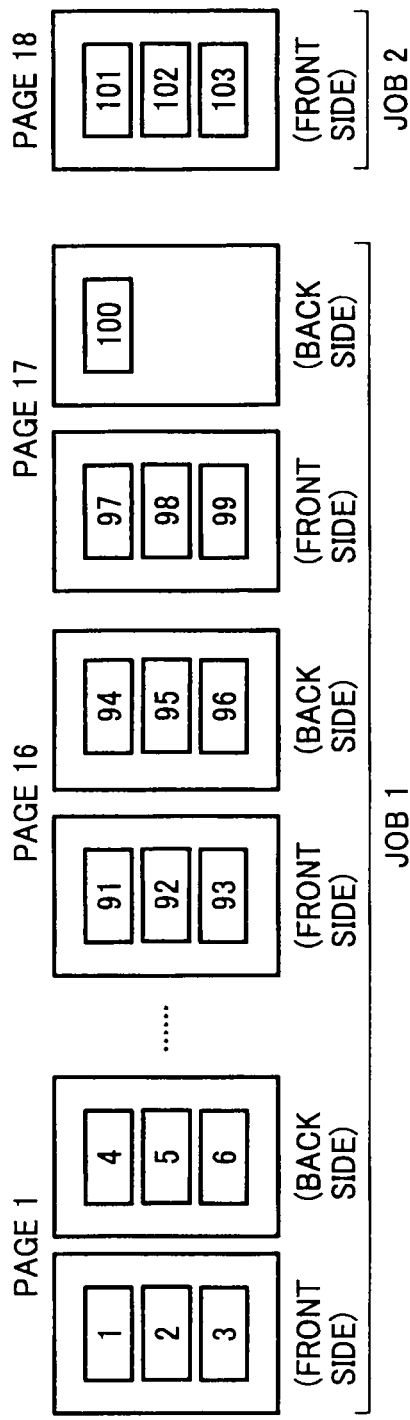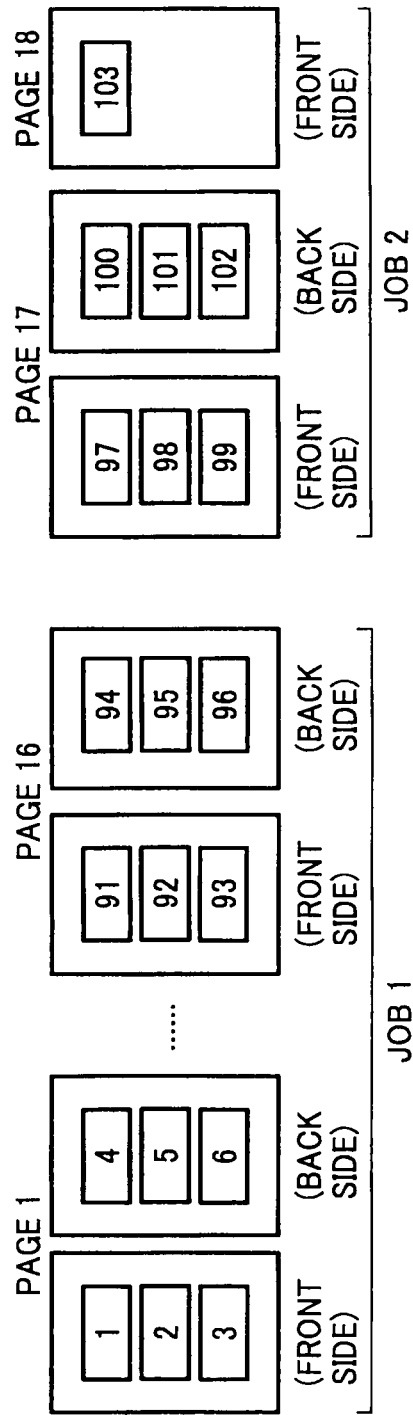

METHOD AND SYSTEM FOR FORMING IMAGE, AND EXTERNAL DEVICE

CROSS-REFERENCE TO RELATED APPLICATIONS

This application is a continuation of U.S. application Ser. No. 12/111,437 filed Apr. 29, 2008, now U.S. Pat. No. 8,072,638, which is based upon and claims the benefit of priority to Japanese Patent Application No. 2007-140646 filed May 28, 2007, the entire contents of each of which are incorporated herein by reference.

BACKGROUND OF THE INVENTION

1. Field of the Invention

The present invention relates to a method and system of forming an image, and an external device.

2. Description of the Related Art

To print out an image obtained by a digital camera according to a conventional technology, the image is first sent from a memory card of the digital camera to a personal computer (PC). An application for image viewing or image processing is then activated, and the image in the PC is output to a printer that is connected to the PC via a printer driver.

In this manner, the image recorded in the digital camera need be transmitted from the PC to the printer. Furthermore, a user has to perform complicated operation, such as operation of an application for printing out the image, or settings of the printer driver.

To solve the above problem, standards for a direct printing system such as PictBridge (registered trademark) have been established in which a digital camera and a printer are directly connected to each other without a PC, and digital cameras or printers that support the standards have been widely spread. For example, Japanese Patent Application Laid-open No. 2004-64740 discloses a technology related to the direct printing system.

Furthermore, in network direct printing disclosed in, for example, Japanese Patent Application Laid-open No. 2006-289907, an output mode including two-sided printing can be set by a printer.

In the conventional technology disclosed in Japanese Patent Application Laid-open No. 2004-64740, a printing device performs the direct printing based on a communication command that is commonly used by various manufacturers. However, functions to be performed based on such a communication command do not include a function of specifying a complicated print mode. If a PC is employed in a printing system, it is possible to specify a mode for outputting an image onto two sides of a medium. However, such a mode cannot be specified in the direct printing system according to the conventional technology.

In the conventional technology disclosed in Japanese Patent Application Laid-open No. 2006-289907, it is possible to specify a mode for outputting an image on two sides of a medium by the printer. However, the limited number of images can be output by the camera as one job. When more than the limited number of images is requested to be output from the camera, the images are divided into several groups, and the images in each of the groups are transmitted as one job. In such a case, if a mode for two-sided printing is simply specified by the printer, two-sided printing cannot be properly performed.

SUMMARY OF THE INVENTION

It is an object of the present invention to at least partially solve the problems in the conventional technology.

According to an aspect of the present invention, there is provided an image forming system including an external device that stores therein image data; and an image forming device that is directly connected to the external device. The external device includes an image storage unit that stores therein image data; a setting unit that sets an output mode to either one of a one-sided output and a two-sided output; and a first communication unit configured to transmit the image data and output-mode data indicative of the output mode to the image forming device. The image forming device includes a second communication unit configured to receive the image data and the output-mode data from the external device; a determining unit that determines an output mode specified in the output-mode data received by the second communication unit; an image output unit that outputs the image data received by the second communication unit in the output mode determined by the determining unit; and an output control unit that controls operation of the image output unit.

According to another aspect of the present invention, there is provided an external device that is configured to be directly connected to an image forming device. The external device includes an image storage unit that stores therein image data; a setting unit that sets an output mode to either one of a one-sided output and a two-sided output; and a communication unit configured to transmit the image data and output-mode data indicative of the output mode to the image forming device.

According to still another aspect of the present invention, there is provided a method of forming an image by an image forming system that includes an image forming device and an external device that are connected directly. The method includes a first processing performed by the external device and a second processing performed by the image forming device. The first processing includes storing image data in a storage unit; setting an output mode to either one of a one-sided output and a two-sided output; and transmitting the image data and output-mode data indicative of the output mode to the image forming device. The second processing includes receiving the image data and the output-mode data from the external device; determining an output mode specified in the output-mode data received at the receiving; outputting the image data received at the receiving in the output mode determined at the determining; and controlling operation at the outputting.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is an example of job data when the user specifies a two-sided output according to the first embodiment;

FIG. 10 is a schematic diagram for explaining an example of dividing images to be transmitted into a plurality of jobs upon performing one-sided printing according to a conventional technology;

FIG. 11 is a schematic diagram for explaining an example of dividing images to be transmitted into a plurality of jobs according to a second embodiment of the present invention;

FIG. 12 is a schematic diagram for explaining an example of dividing images to be transmitted into a plurality of jobs upon two-sided printing according to a conventional technology; and FIG. 13 is a schematic diagram for explaining an example of dividing images to be transmitted into a plurality of jobs according to a third embodiment of the present invention.

DETAILED DESCRIPTION OF THE PREFERRED EMBODIMENTS

Exemplary embodiments of the present invention are explained in detail below with reference to the accompanying drawings.

Figure 1:
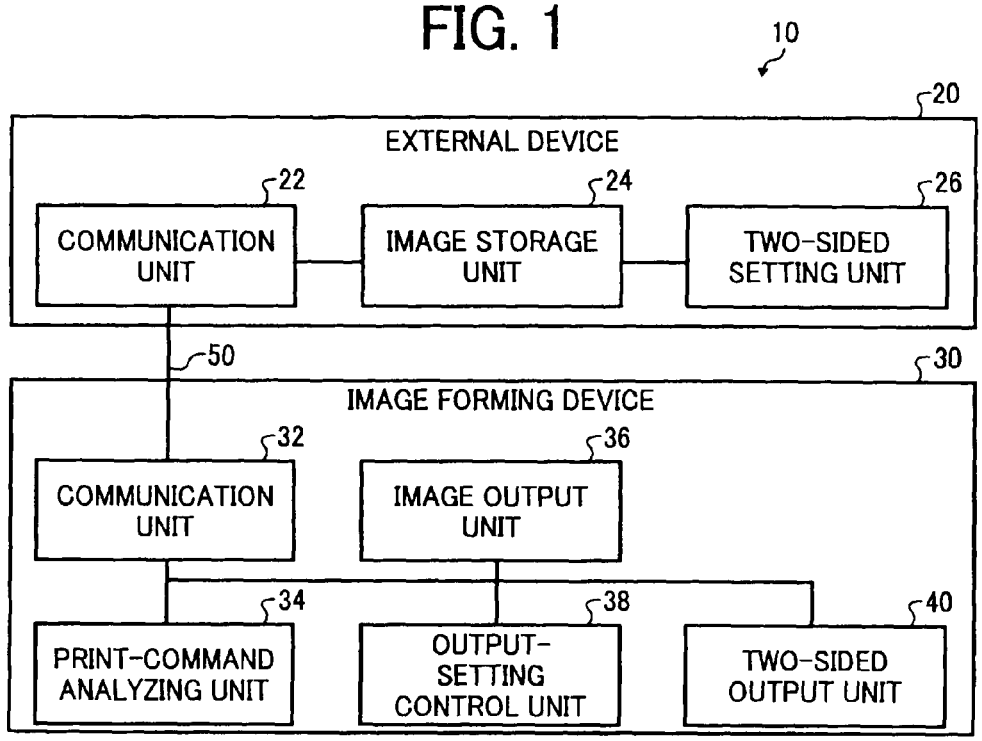
FIG. 1 is a block diagram of an image forming system according to a first embodiment of the present invention.

FIG. 1 is a block diagram of an image forming system 10 according to a first embodiment of the present invention. The image forming system 10 includes an external device 20 and an image forming device 30. The external device 20 stores therein image data. The image forming device 30 acquires the image data from the external device, and outputs the acquired image data. The external device 20 and the image forming device 30 are directly connected to each other via a universal serial bus (USB) cable 50.

The external device 20 includes a communication unit 22, an image storage unit 24, and a two-sided setting unit 26. The communication unit 22 communicates with the image forming device 30 via the USB cable 50. The image storage unit 24 is a storage device, such as a memory card. The two-sided setting unit 26 is a characteristic unit in the first embodiment. Specifically, when a user specifies a mode for outputting an image onto one side or two sides of a medium, such as a paper, setting data indicative of the mode is transmitted from the external device 20 to the image forming device 30. A bitmap image for either an image output unit 36 or a two-sided output unit 40 is then created based on the setting data. Thus, the image is output onto a medium.

The image forming device 30 includes a communication unit 32, a print-command analyzing unit 34, the image output unit 36, an output-setting control unit 38, and the two-sided output unit 40.

The communication unit 32 communicates with the external device 20 via the USB cable 50. The print-command analyzing unit 34 receives, from the external device 20, an image file, image file identification (ID) for identifying an image file, and print setting data about printing process. The print-command analyzing unit 34 also transmits printing capability data of the image forming device 30 to the external device 20.

The image output unit 36 outputs specified image data onto a paper medium, or the like. The output-setting control unit 38 controls the image output unit 36 based on the print setting data received by the print-command analyzing unit 34, and specified print settings received by the image forming device 30. For example, the output-setting control unit 38 causes the image output unit 36 to output an image file onto the predetermined number of print copies. Furthermore, the output-setting control unit 38 causes the image output unit 36 to output an edited image onto the predetermined number of print copies. The two-sided output unit 40 outputs specified image data onto two sides of a paper medium, or the like.

Figure 2:
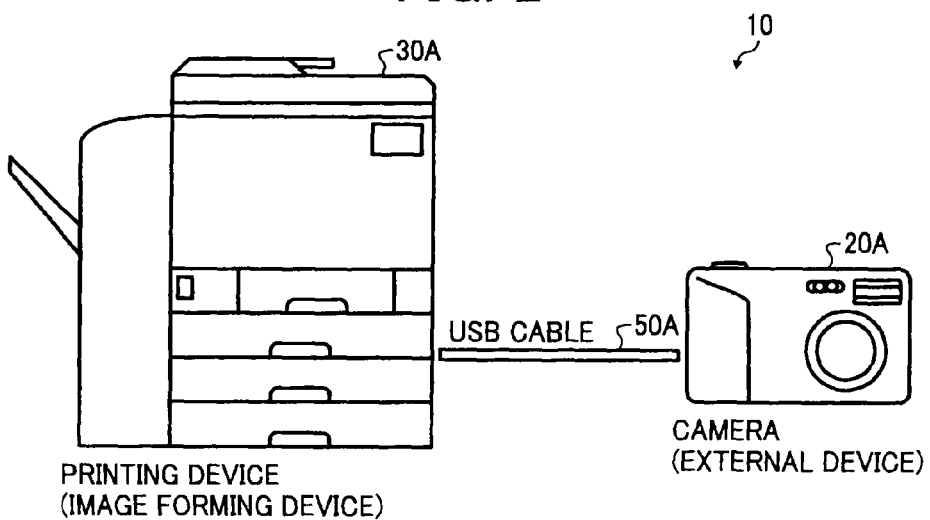
FIG. 2 is an example of a configuration of the image forming system.

FIG. 2 is an example of a configuration of the image forming system 10. The image forming system 10 includes a camera 20A (external device) and a printing device 30A (image forming device). The camera 20A is, for example, a digital still camera. The printing device 30A is, for example, a direct printer. The printing device 30A performs the direct printing. Specifically, the printing device 30A receives an image directly from the camera 20A, and prints out the received image. The camera 20A and the printing device 30A are directly connected to each other via a USE cable 50A. The direct printing can be performed between the camera 20A and the printing device 30A by using a specified communication format, such as the PictBridge.

Figure 3:
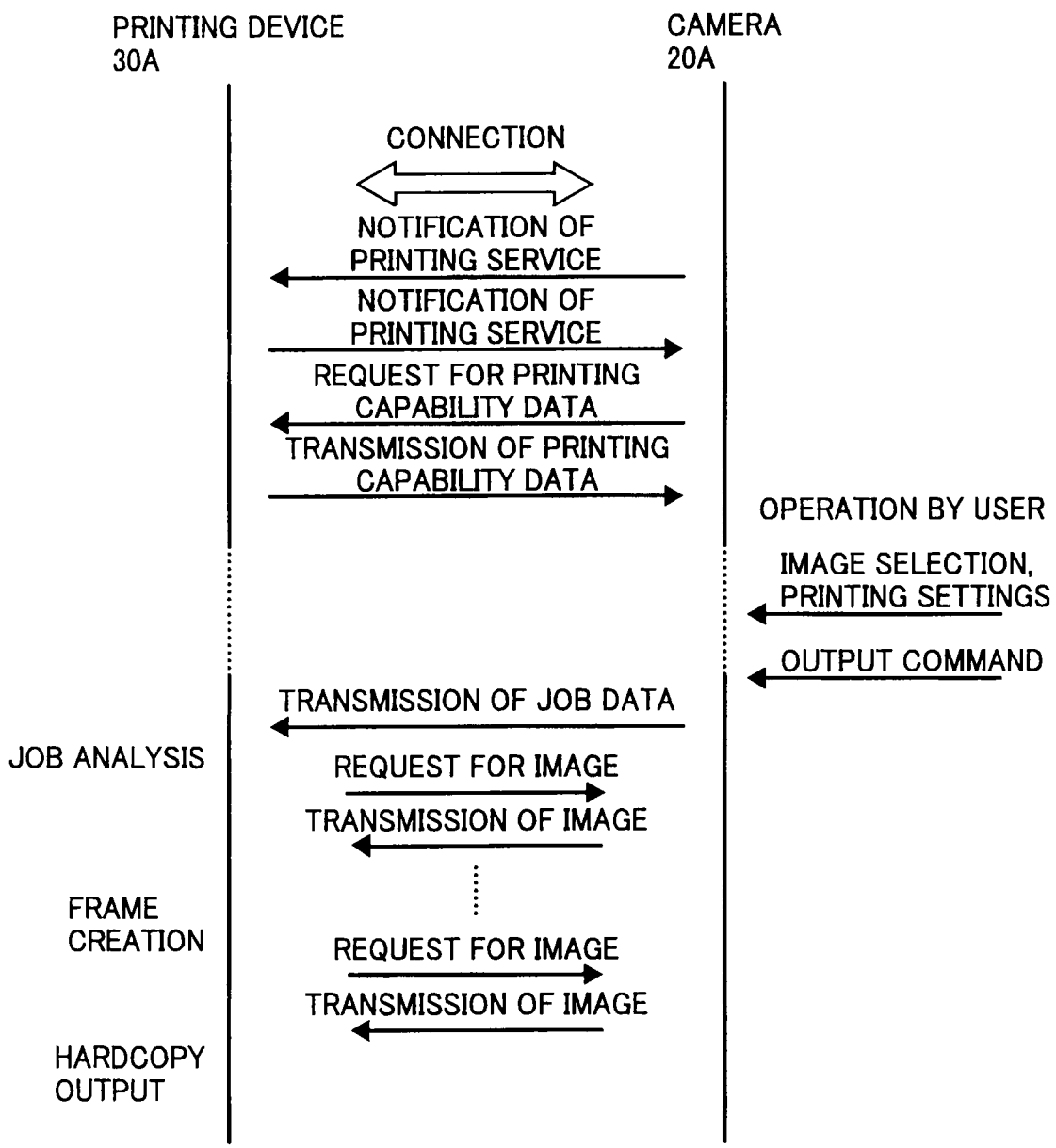
FIG. 3 is a sequence diagram for explaining a basic process of a direct printing performed by the image forming system shown in FIG. 2.
Figures 4, 5:
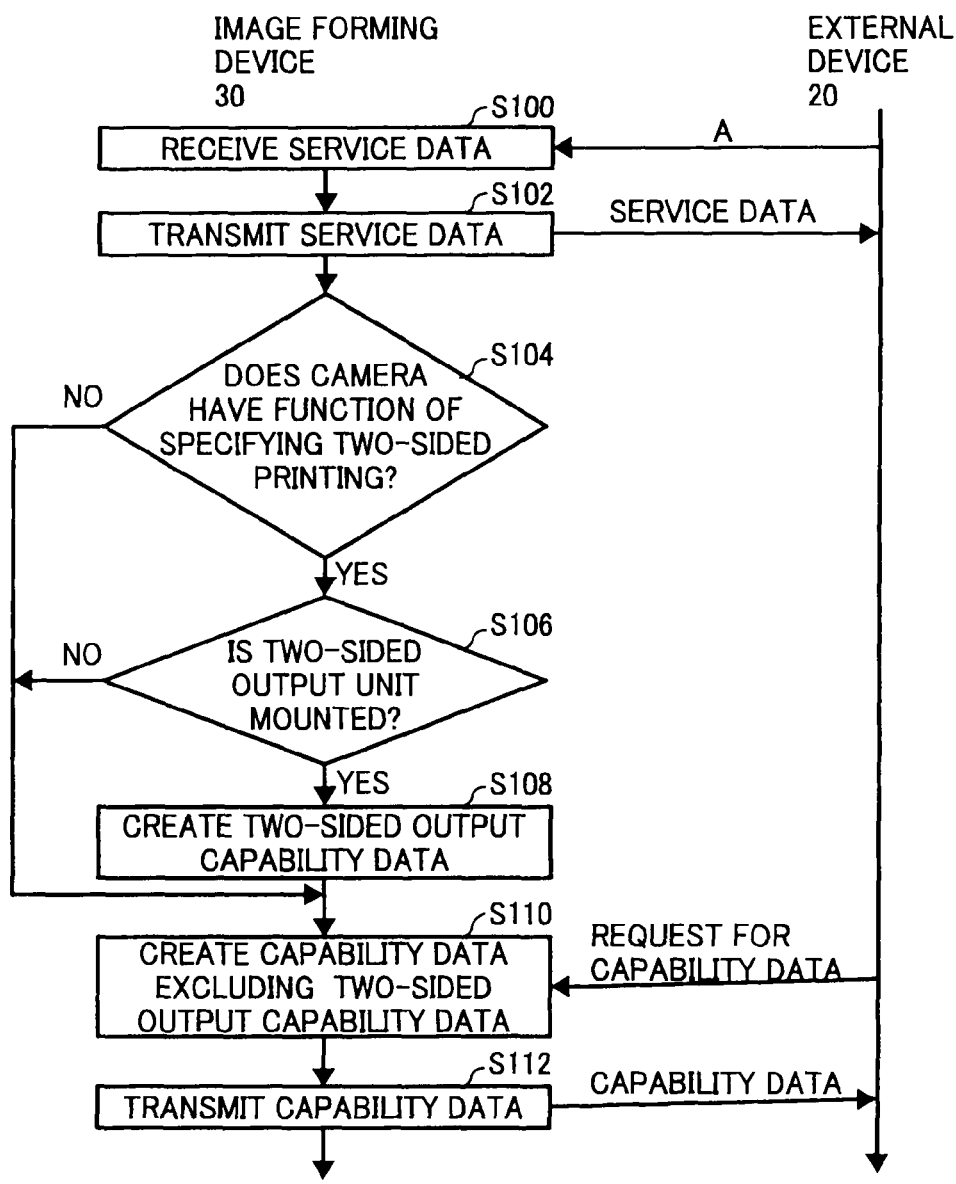
FIG. 4 is an example of job data for the direct printing to be transmitted from a camera to a printing device shown in FIG. 2.
FIG. 5 is a flowchart of operation performed by the image forming device shown in FIG. 1.

FIG. 3 is a sequence diagram for explaining a basic process of the direct printing performed by the image forming system 10 shown in FIG. 2. FIG. 4 is an example of job data for the direct printing to be transmitted from the camera 20A to the printing device 30A. As shown in FIG. 3, when the printing device 30A and the camera 20A are directly connected to each other via the USE cable 50A, the camera 20A and the printing device 30A notify each other of printing service thereof. When the camera 20A requests printing capability data from the printing device 30A, the printing device 30A transmits the printing capability data thereof to the camera 20A. The printing capability data contains, for example, data on print quality, a paper size, availability of index printing, and layout of an image to be printed on one page.

The camera 20A configures a user interface (UI) for the direct printing based on the printing capability data received from the printing device 30A. The user operates the UI to select one or more images to be output among images in the camera 20A, set a condition for output of the selected image, and send a command to output the image. Thus, the job data shown in FIG. 4 is transmitted from the camera 20A to the printing device 30A. The job data contains data on print quality, a size of a paper onto which an image is output, whether the image has been corrected, layout of the image, and ID of the image to be output.

As shown in FIG. 3, when the printing device 30A receives the job data from the camera 20A, the print-command analyzing unit 34 analyzes the job data, thereby setting a condition for output of the image. Furthermore, the printing device 30A refers to the ID of the image contained in the job data, and then requests image data with the ID from the camera 20A. Upon receiving the image data, the printing device 30A decodes the received image data, and draws an image, thereby outputting the image onto a paper.

FIG. 5 is a flowchart of operation performed by the image forming device 30. When the image forming device 30 and the external device 20 are directly connected to each other via the USB cable 50 as shown in FIG. 1, the image forming device 30 and the external device 20 notify each other of printing service thereof. Specifically, when the external device 20 transmits service data thereof to the image forming device 30, the communication unit 32 receives the service data (Step S100). The image forming device 30 then transmits service data thereof to the external device 20 (Step S102).

The image forming device 30 determines whether the camera (external device 20) connected to the image forming device 30 has a function of specifying two-sided printing based on the service data received from the external device 20 (Step S104). If the external device 20 has the function of specifying two-sided printing, the image forming device 30 creates two-sided output capability data as one of the printing capability data (Step S108). The printing capability data is to be transmitted to the external device 20 at Step S112. When the image forming device 30 receives a request for capability data from the external device 20, the image forming device 30 transmits the capability data including the two-sided output capability data to the external device 20 (Step S112).

To create the capability data, the image forming device 30 checks whether the two-sided output unit 40 is mounted therein (Step S106). If the two-sided output unit 40 is mounted in the image forming device 30 (Yes at Step S106), the image forming device 30 creates the two-sided output capability data (Step S108). If the two-sided output unit 40 is not mounted in the image forming device 30 (No at Step S106), the image forming device 30 creates the capability data excluding the two-sided output capability data (Step S110).

If the camera does not have the function of specifying two-sided printing (No at Step S104), or if the two-sided output unit 40 is not mounted in the image forming device 30 (No at Step S106), the image forming device 30 creates the capability data excluding the two-sided output capability data (Step S110). Thus, because the image forming device 30 does not transmit the two-sided output capability data to the external device 20, the function of specifying two-sided printing is not effectively performed in this direct printing system configured by the external device 20 and the image forming device 30.

Figure 6:
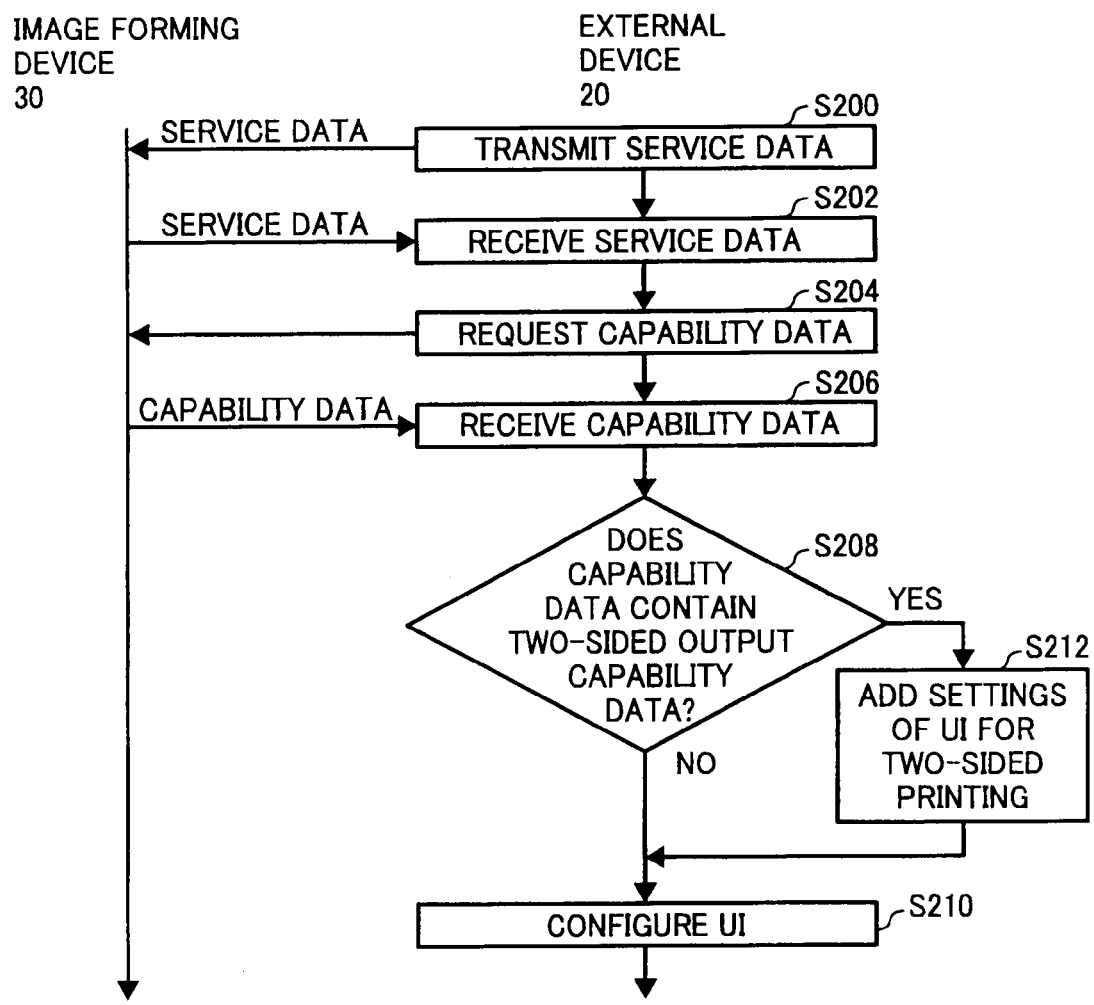
FIG. 6 is a flowchart of operation performed by an external device shown in FIG. 1.
Figures 7, 8:
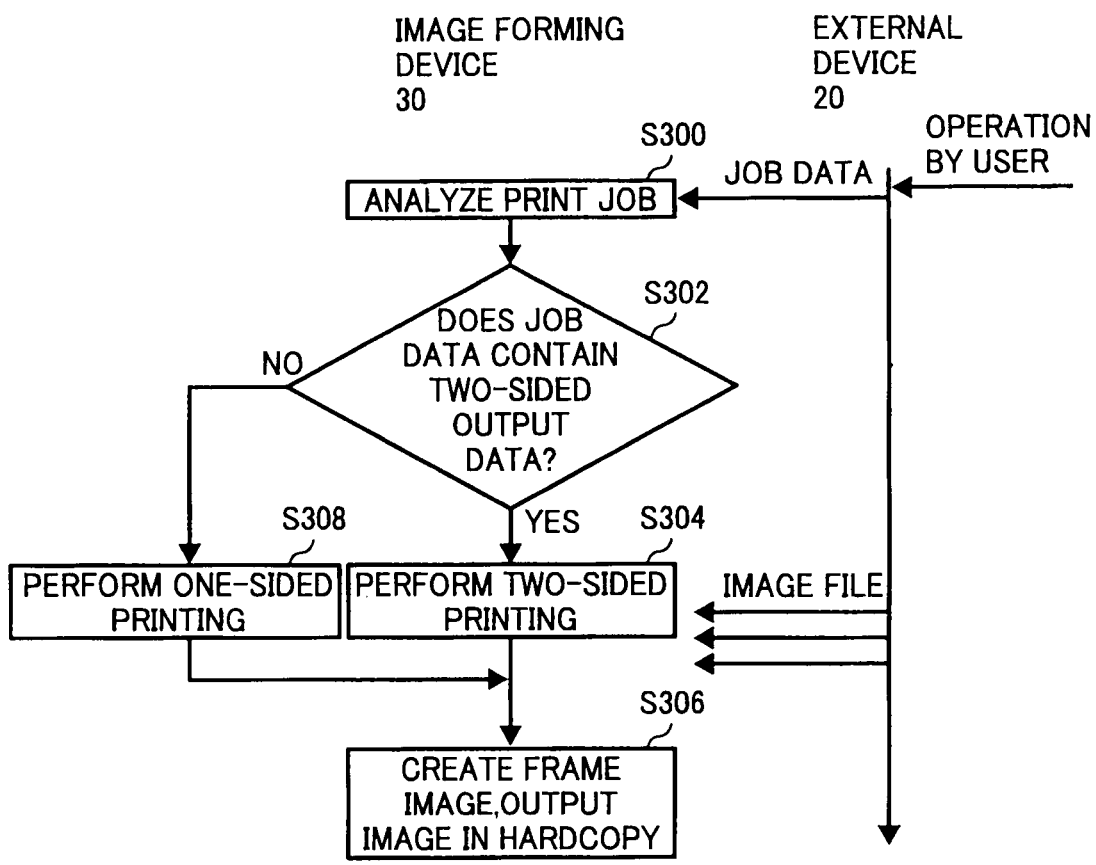
FIG. 7 is a flowchart of operation performed by the image forming device when receiving a job output command from the external device.
FIG. 8 is an example of capability data to be transmitted from the image forming device to the external device.

FIG. 6 is a flowchart of operation performed by the external device 20. FIG. 7 is a flowchart of operation performed by the image forming device 30 when receiving a job output command from the external device 20. FIG. 8 is an example of the capability data to be transmitted from the image forming device 30 to the external device 20. FIG. 9 is an example of the job data when the user specifies a two-sided output. When the image forming device 30 and the external device 20 are directly connected to each other via the USB cable 50 as shown in FIG. 1, the image forming device 30 and the external device 20 notify each other of printing service thereof. Specifically, when the external device 20 transmits service data thereof to the image forming device 30 (Step S200), the image forming device 30 transmits service data thereof to the external device 20. The external device 20 then receives the service data from the image forming device 30 (Step S202).

After the external device 20 and the image forming device 30 transmit and receive the service data to and from each other, the external device 20 requests capability data from the image forming device 30 (Step S204). The external device 20 then receives the capability data from the image forming device 30 (Step S206). As shown in FIG. 8, it is determined whether the capability data contains the element of "Duplex" (whether the element of "Duplex" is ON or OFF). The element of "Duplex" indicates two-sided output capability. The UI is configured when the capability data contains the element of "Duplex".

The external device 20 determines whether the received capability data contains two-sided output capability data (Step S208). If the capability data contains the two-sided output capability data (Yes at Step S208), settings of the UI are added (Step S212), so that the user can specify two-sided printing via the UI by using an operating unit (not shown) of the camera. The external device 20 then configures the two-sided setting unit 26 as shown in FIG. 1 (Step S210).

If the capability data does not contain the two-sided output capability data (No at Step S208), the external device 20 configures the UI in which a menu for specifying two-sided printing is not created (Step S210). Therefore, the function of specifying two-sided printing is not effectively performed in this direct printing system configured by the external device 20 and the image forming device 30.

As shown in FIG. 7, the user specifies two-sided printing through the menu in the UI. The user then selects an image to be output, and sends a command for a print job to the image forming device 30. When the image forming device 30 receive the print job, the print-command analyzing unit 34 analyzes the print job (Step S300). The print-command analyzing unit 34 determines whether job data contains two-sided output data (Step S302).

As shown in FIG. 9, when the element of "Duplex" contained in the job data is ON, the image forming device 30 analyzes the job data, and performs two-sided printing (Step S304). When the element of "Duplex" is not ON, the image forming device 30 performs one-sided printing (Step S308). When the image forming device 30 performs a two-sided or one-sided printing, the image forming device 30 creates a frame image based on an image file received from the external device 20, and outputs an image onto a paper (Step S306).

As described above, in the first embodiment, the external device 20 and the image forming device 30 are directly connected to each other. When the direct printing is performed between the external device 20 and the image forming device 30, settings for two-sided printing can be specified by the external device 20. Thus, it is possible to properly perform two-sided printing.

When the user specifies settings for output of the image forming device 30 via the two-sided setting unit 26, it is necessary for the external device 20 to create the job data shown in FIG. 9. However, when the image forming device 30 outputs multiple images at one time, a large amount of image data need be contained in the job data. In such a case, if the amount of image data is larger than a resource capacity of the external device 20, the external device 20 cannot create the job data.

In such a case, the multiple images are divided into several groups in such a manner that a data amount of one group is equal to or smaller than a maximum data amount that the external device 20 can create job data, and the images in each of the groups are transmitted as one job. In this manner, it is possible to print out the multiple images at one time. However, a page break can be made at an undesired position depending on the predetermined number of images printable on one page (hereinafter, "maximum page-based image number". In a second embodiment of the present invention, even if the images are transmitted as a plurality of jobs upon the direct printing between the external device 20 and the image forming device 30, it is possible to prevent placing a page break at an undesired position. Therefore, it is possible to properly perform one-sided printing.

FIG. 10 is a schematic diagram for explaining an example of dividing images to be transmitted into a plurality of jobs upon one-sided printing according to a conventional technology. FIG. 11 is a schematic diagram for explaining an example of dividing images to be transmitted into a plurality of jobs according to the second embodiment. It is assumed that the maximum number of images that can be processed by the camera as one job (hereinafter, "maximum job-based image number") is 100, the user inputs a command to output 103 images by one-sided printing, and the maximum page-based image number is three. As shown in FIG. 10, the camera divides the images at the 100th image, i.e., the maximum job-based image number. Therefore, the first job contains the 1st to the 100th images. In this case, only the 100th image is output onto page 34. The 101st to the 103rd images are output onto page 35 in the second job. As a result, an undesired page break is made after the 100th image on page 34. This printing result will be different from expectation of the user who has made the command to output the 103 images.

In the second embodiment, when the user requests with the two-sided setting unit 26 the image forming device 30 to output image data by one-sided printing, the number of images to be contained in one job is set to a multiple of a specified mode. The specified mode means the maximum page-based image number. It is assumed that the maximum job-based image number is 100, and the maximum page-based image number is three. Specifically, as shown in FIG. 11, the number 99 is a multiple of the number 3, and the number 99 is smaller than 100. Therefore, the 99th image is the maximum number at which the images are divided. Thus, the first job contains the 1st to the 99th images, and the second job contains the 100th to the 103rd images. In this manner, it is possible to prevent the images from being divided at an undesired position. It is possible to properly perform one-sided printing.

As described above, in the second embodiment, when images are printed on one side of each paper, the images are not divided at the maximum job-based image number. Instead, the images are divided at the number that is a multiple of the maximum page-based image number, and that is smaller than the maximum job-based image number. Therefore, it is possible to prevent an undesired page break between the images. Thus, it is possible to properly perform one-sided printing.

FIG. 12 is a schematic diagram for explaining an example of dividing images to be transmitted into a plurality of jobs upon two-sided printing according to a conventional technology. FIG. 13 is a schematic diagram for explaining an example of dividing images to be transmitted into a plurality of jobs according to a third embodiment of the present invention. It is assumed that the maximum job-based image number is 100, the user inputs a command to output 103 images by two-sided printing, and the maximum page-based image number is three. As shown in FIG. 12, the camera divides the images at the 100th image, i.e., the maximum job-based image number. More than the maximum number of images cannot be processed due to an insufficient resource of the camera. As a result, a page break is made after the 100th image on the back side of page 17. The 101st image is printed on the front side of page 18. This printing result will be different from expectation of the user who has made the command to output the 103 images.

In the third embodiment, when the user requests with the two-sided setting unit 26 the image forming device 30 to output image data by two-sided printing, the number of images to be contained in one job is set to an even-multiple of a specified mode. The specified mode means the maximum page-based image number. It is assumed that the maximum job-based image number is 100, and the maximum page-based image number is three. Specifically, as shown in FIG. 13, the number 99 is an even-number multiple of the number 3. Therefore, the 99th image is the maximum number at which the images are divided. Thus, the first job contains the 1st to the 96th images. The 1st to the 96th images are printed on pages 1 to 16. The second job contains the 97th to the 103rd images. In this manner, it is possible to prevent the images from being divided at the undesired position. It is possible to properly perform two-sided printing.

As described above, in the third embodiment, when the images are printed on two sides of each paper, the images are not divided at the maximum job-based image number. Instead, the images are divided at the number that is an even-number multiple of the maximum page-based image number, and that is smaller than the maximum job-based image number. Therefore, it is possible to prevent a page break at an undesired position. Thus, it is possible to properly perform one-sided printing.

An image forming program executed by the image forming system for the direct printing can be stored, in a form of a file that is installable and executable on a computer, in a recording medium readable by the computer, such as a compact disk-read only memory (CD-ROM), a floppy (registered trademark) disk (FD), and a digital versatile disk (DVD).

When the image forming device 30 reads the image forming program from the recording medium and executes the read program, the programs are loaded on a main memory, thereby creating each unit of a software configuration on the main memory.

On the other hand, the image forming program can be stored in another computer connected to the computer via a network such as the Internet, and downloaded to the computer via the network.

According to an aspect of the present invention, setting information for two-sided printing can be transmitted directly from the external device to the image forming device upon the direct printing. Therefore, one-sided printing and two-sided printing can be selectively performed in a proper manner.

Moreover, before image data is transmitted from the external device to the image forming device, it can be determined whether two-sided printing is set, or whether the image forming device can perform two-sided printing based on a communication command indicative of setting data. Therefore, data transmission can be effectively reduced.

Furthermore, when the external device is connected to the image forming device, the external device can determine whether the image forming device can perform two-sided printing. Therefore, it is possible to reduce time for selecting an image to be output, and setting a condition for output.

Moreover, settings for outputting an image on two sides of a medium can be effectively specified.

Furthermore, the external device can specify print settings for the image forming device upon the direct printing in a proper manner.

Moreover, it is possible to divide images at the number of images depending on a capacity of the external device, and transmit the divided images to the image forming device. Therefore, it is possible to specify print settings for the image forming device in a proper manner.

Furthermore, it is possible to output the images onto a medium without a page break at an undesired position.

Moreover, it is possible to output images onto two sides of a medium without a page break at an undesired position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An external device configured to be directly connected to an image forming device, the external device comprising:
   an image storage unit configured to store therein image data;

a setting unit configured to issue a plurality of output commands of the image data to an image forming device based on a total number of images to be output by the image forming device and a specified mode indicative of a number of images to be output onto one side of a medium; and a communication unit configured to transmit the image data based on the plurality of output commands to the image forming device.

2. The external device according to claim 1, wherein a number of images to be output in one of the output commands is a multiple of the specified mode.

3. The external device according to claim 2, wherein
the setting unit is further configured to set an output mode to either of a one-sided output and a two-sided output, and
the plurality of output commands are issued based on the output mode.

4. The external device according to claim 3, wherein
upon setting, by the setting unit, the output mode to the two-sided output, the setting unit issues the plurality of output commands of the image data to the image forming device, and
a number of images to be output in one of the output commands is an even-number multiple of the specified mode.

5. The external device according to claim 3, wherein
upon setting, by the setting unit, the output mode to the one-sided output, the setting unit issues the plurality of output commands of the image data to the image forming device, and
a number of images to be output in one of the output commands is a multiple of the specified mode.

6. The external device according to claim 3, further comprising:
a user interface configured to display operating mode information received from the image forming device, the operating mode information indicating at least one operating mode of the image forming device.

7. An image forming system, comprising:
an external device to store therein image data; and
an image forming device directly connected to the external device, wherein
the external device includes:
an image storage unit configured to store therein image data,
a setting unit configured to issue a plurality of output commands of the image data to an image forming device based on a total number of images to be output by the image forming device and a specified mode indicative of a number of images to be output onto one side of a medium, and
a communication unit configured to transmit the image data based on the plurality of output commands to the image forming device.

8. The image forming system according to claim 7, wherein a number of images to be output in one of the output commands is a multiple of the specified mode.

9. The image forming system according to claim 8, wherein
the setting unit is further configured to set an output mode to either of a one-sided output and a two-sided output, and
the plurality of output commands are issued based on the output mode.

10. The image forming system according to claim 9, wherein
upon setting, by the setting unit, the output mode to the two-sided output, the setting unit issues the plurality of output commands of the image data to the image forming device, and
a number of images to be output in one of the output commands is an even-number multiple of the specified mode.

11. The image forming system according to claim 9, wherein
upon setting, by the setting unit, the output mode to the one-sided output, the setting unit issues the plurality of output commands of the image data to the image forming device, and
a number of images to be output in one of the output commands is a multiple of the specified mode.

12. The image forming system according to claim 9, further comprising:
a user interface configured to display operating mode information received from the image forming device, the operating mode information indicating at least one operating mode of the image forming device.

13. A method of forming an image by an image forming system that includes an image forming device and an external device that are connected directly, the method comprising:
storing, by an image storage unit, image data;
issuing, by a setting unit, a plurality of output commands of the image data to an image forming device based on a total number of images to be output by the image forming device and a specified mode indicative of a number of images to be output onto one side of a medium; and
transmitting, by a communication unit, the image data based on the plurality of output commands to the image forming device.

14. The method according to claim 13, wherein a number of images to be output in one of the output commands is a multiple of the specified mode.

15. The method according to claim 14, further comprising:
setting, by the setting unit, an output mode to either of a one-sided output and a two-sided output; and
issuing the plurality of output commands based on the output mode.

16. The method according to claim 15, further comprising:
issuing, by the setting unit, the plurality of output commands of the image data to the image forming device upon setting, by the setting unit, the output mode to the two-sided output, wherein
a number of images to be output in one of the output commands is an even-number multiple of the specified mode.

17. The method according to claim 15, further comprising:
issuing, by the setting unit, the plurality of output commands of the image data to the image forming device upon setting, by the setting unit, the output mode to the one-sided output, wherein
a number of images to be output in one of the output commands is a multiple of the specified mode.

18. The method according to claim 15, further comprising:
displaying, via a user interface, operating mode information received from the image forming device, the operating mode information indicating at least one operating mode of the image forming device.

* * * * *